United States Patent
Edvold et al.

(10) Patent No.: US 6,724,956 B2
(45) Date of Patent: Apr. 20, 2004

(54) METHOD AND APPARATUS FOR PROVIDING DISPERSION COMPENSATION

(75) Inventors: Bent Edvold, Vallensback (DK); Lene V. Jorgensen, Copenhagen N (DK); Lars Gruner-Nielsen, Bronshoj (DK); William A. Reed, Summit, NJ (US)

(73) Assignee: Fitel USA Corporation, Norcross, GA (US)

( * ) Notice: Subject to any disclaimer, the term of this patent is extended or adjusted under 35 U.S.C. 154(b) by 168 days.

(21) Appl. No.: 10/116,314

(22) Filed: Apr. 3, 2002

(65) Prior Publication Data

US 2003/0190118 A1 Oct. 9, 2003

(51) Int. Cl.$^7$ .................................................. G02B 6/28
(52) U.S. Cl. ....................... 385/24; 385/123; 385/127; 398/147; 398/148
(58) Field of Search ...................... 385/24, 27, 37, 385/123–127; 398/140, 147, 148

(56) References Cited

U.S. PATENT DOCUMENTS

| | | | |
|---|---|---|---|
| 4,261,639 A | * | 4/1981 | Kogelnik et al. ............. 385/27 |
| 4,807,950 A | | 2/1989 | Glenn et al. |
| 5,191,631 A | | 3/1993 | Rosenberg |
| 5,327,515 A | | 7/1994 | Anderson et al. |
| 5,361,319 A | | 11/1994 | Antos et al. |
| 5,367,588 A | | 11/1994 | Hill et al. |
| 5,371,597 A | | 12/1994 | Favin et al. |
| 5,430,817 A | | 7/1995 | Vengsarkar |
| 5,611,016 A | | 3/1997 | Fangmann et al. |
| 5,647,039 A | | 7/1997 | Judkins et al. |
| 5,740,292 A | | 4/1998 | Strasser |
| 5,781,673 A | | 7/1998 | Reed et al. |
| 5,878,182 A | | 3/1999 | Peckham |
| 6,011,886 A | | 1/2000 | Abramov et al. |
| 6,055,348 A | | 4/2000 | Jin et al. |
| 6,137,924 A | | 10/2000 | Strasser et al. |
| 6,148,127 A | | 11/2000 | Adams et al. |
| 6,317,549 B1 | | 11/2001 | Brown |

FOREIGN PATENT DOCUMENTS

WO    WO 01/69822    9/2001

\* cited by examiner

*Primary Examiner*—Phan T. H. Palmer
(74) *Attorney, Agent, or Firm*—Gardner Groff, P.C.

(57) ABSTRACT

A dispersion compensation module (DCM) for compensating dispersion of an optical fiber transmission link is provided. The optical fiber transmission link comprises a transmission fiber and the DCM. The DCM comprises at least first and second dispersion compensating fibers, DCF1 and DCF2, respectively. DCF1 and DCF2 each have a dispersion, D1 and D2, respectively, a dispersion slope, S1 and S2, respectively, and a relative dispersion slope, RDS1 and RDS2, respectively. The transmission fiber also has a dispersion, $D_{TransFiber}$, a dispersion slope, $S_{TransFiber}$, and a relative dispersion slope, $RDS_{TransFiber}$. DCF1 and DCF2 are selected based on their respective relative dispersion slopes, RDS1 and RDS2, respectively. DCF1 and DCF2 have particular, lengths, L1 and L2, respectively. The DCFs are combined with each other and with the transmission fiber and RDS1 and RDS2 are such that the combination of the transmission fiber with the combined DCFs results in overall dispersion compensation of the optical fiber transmission link.

27 Claims, 7 Drawing Sheets

METHOD AND APPARATUS FOR PROVIDING DISPERSION COMPENSATION

TECHNICAL FIELD OF THE INVENTION

The present invention relates to optical fibers and, more particularly, to providing very accurate dispersion compensation over an entire range of wavelengths.

BACKGROUND OF THE INVENTION

Dispersion in a glass fiber causes pulse spreading for pulses that include a range of wavelengths, due to the fact that the speed of light in a glass fiber is a function of the transmission wavelength of the light. Pulse broadening is a function of the fiber dispersion, the fiber length and the spectral width of the light source. Dispersion for individual fibers is generally illustrated using a graph having dispersion on the vertical axis (in units of picoseconds (ps) per nanometer (nm), or ps/nm) or ps/nm-km (kilometer) and wavelength on the horizontal axis. There can be both positive and negative dispersion, so the vertical axis may range from, for example, −250 to +250 ps. The wavelength on the horizontal axis at which the dispersion equals zero corresponds to the highest bandwidth for the fiber. However, this wavelength typically does not coincide with the wavelength at which the fiber transmits light with minimum attenuation.

For example, typical single mode fibers generally transmit best (i.e., with minimum attenuation) at 1550 nm, whereas dispersion for the same fiber would be approximately zero at 1310 nm. The theoretical minimum loss for glass fiber is approximately 0.16 db/km, and that occurs at the transmission wavelength of about 1550 nm. Because minimum attenuation is prioritized over zero dispersion, the wavelength normally used to transmit over such fibers is typically 1550 nm. Also, Erbium-doped amplifiers, which currently are the most commonly used optical amplifiers for amplifying optical signals carried on a fiber, operate in 1530 to 1565 nm range. Because dispersion for such a fiber normally will not be zero at a transmission wavelength of 1550 nm, attempts are constantly being made to improve dispersion compensation over the transmission path in order to provide best overall system performance (i.e., low optical loss and low dispersion).

Many techniques have been used for dispersion compensation, including the design and use of dispersion-shifted and dispersion flattened fibers. Dispersion Compensating Modules (DCMs) have also been used in optical communications systems for dispersion compensation, especially in wavelength division multiplexing (WDM) systems. A number of patents describe various uses of DCMs to compensate dispersion including: U.S. Pat. No. 4,261,639 (Kogelnik et al.); U.S. Pat. No. 4,969,710 (Tick et al.); U.S. Pat. No. 5,191,631 (Rosenberg); and U.S. Pat. No. 5,430,822 (Shigematsu et al.). These patents compensate dispersion by inserting DCMs at appropriate intervals along the transmission path. The DCMs usually contain Dispersion Compensating Fiber (DCF) of an appropriate length to produce dispersion of approximate equal magnitude (but opposite sign) to that of the transmission fiber.

One problem with using the known DCMs to compensate dispersion is that DCF designs are very sensitive to production tolerances. Therefore, if the DCF design is not highly precise, then when the DCF is combined with the transmission fiber, the resulting transmission link may have too much residual dispersion (i.e., dispersion on wavelength channels other than the center wavelength channel being compensated). This is especially true in broadband applications where the transmission rates may be, for example, 40 gigabits per second (Gbit/s). Also, once the DCF is produced, only the length of the DCF can be selected to meet the desired target for dispersion compensation. Moreover, selection of the DCF length (and thus the dispersion of the DCM) should ensure that first order and higher order dispersion are compensated.

When compensating for higher order dispersion, it is very important that the Relative Dispersion Slope (RDS) of the transmission fiber match the RDS of the DCF (and consequently of the corresponding DCM). For a given fiber, the RDS is defined as the ratio of the dispersion slope, S, of the fiber to the dispersion, D, of the fiber. Thus, the RDS for a given fiber is equal to S/D for that fiber. For a DCF combined with a transmission fiber, the total dispersion and the total dispersion slope of the compensated link, $D_{LINK}$ and $S_{LINK}$, respectively, can be expressed by Equations 1 and 2, respectively, as follows:

$$D_{Link}=D_{TransmFiber} \times L_{TransmFiber}+D_{DCF} \times L_{DCF} \quad \text{(Equation 1)}$$

$$S_{Link}=S_{TransmFiber} \times L_{TransmFiber}+S_{DCF} \times L_{DCF} \quad \text{(Equation 2)}$$

In Equation 1, $D_{TransmFiber}$ corresponds to the dispersion of the transmission fiber, $L_{DCF}$ corresponds to the length of the DCF, and $D_{DCF}$ corresponds to the dispersion of the DCF. In Equations 1 and 2, $L_{TransmFiber}$ corresponds to the length of the transmission fiber and $L_{DCF}$ corresponds to the length of the DCF. In Equation 2, $S_{TransmFiber}$ corresponds to the dispersion slope of the transmission fiber and $S_{DCF}$ corresponds to the dispersion slope of the DCF.

When the dispersion of the system is compensated, i.e., when $D_{Link}=0$ (i.e., when $D_{LINK}$ is set equal to 0 for purposes of calculations), the length of DCF needed to compensate for the dispersion slope and the dispersion of the link can be determined by Equation 3. Because the values of the DCF dispersion, the transmission fiber dispersion, and the transmission fiber link are known, the length of DCF needed is given by:

$$L_{DCF}=-(D_{TransmFiber}/D_{DCF}) \times L_{TransmFiber}. \quad \text{(Equation 3)}$$

In order to compensate the link for the dispersion slope, $S_{DCF}$, of the DCF itself, the RDS for the DCF and for the transmission fiber must be matched such that:

$$RDS_{Trans.Fiber} = \frac{S_{Trans.Fiber}}{D_{Trans.Fiber}} = \frac{S_{DCF}}{D_{DCF}} = RDS_{DCF} \quad \text{(Equation 4)}$$

However, when producing a DCF, the production tolerances inherently cause variations in the dispersion and in the RDS of the DCF. Dispersion variations at the center wavelength can be compensated by choosing the correct length of DCF, but RDS variations are not compensated. Tolerances on RDS for DCF are typically about ±15%, which can cause significant residual dispersion at the edges of the transmission band, which is undesirable for the aforementioned reasons.

A technique that uses DCM technology for improving dispersion compensation over a center wavelength and for reducing residual dispersion on wavelengths at the edges of the transmission band is disclosed in U.S. Pat. No. 5,781,673 (hereinafter the '673 patent), which is assigned to the assignee of the present invention, and which is incorporated herein by reference in its entirety. This patent discloses a wavelength division multiplexing (WDM) system in which the transmission path between a WDM receiver and a WDM transmitter comprises a transmission fiber of a particular length having a particular dispersion of a particular sign combined with a DCF of a particular length and having a particular dispersion of opposite sign as that of the dispersion of the transmission fiber. This combination ensures that the center wavelength of the channel will have a nominally zero overall dispersion.

In order to compensate for the residual dispersion on the other channels, the '673 patent discloses adding to the link a dispersion slope compensating fiber (DSCF) of a particular length and having a relatively large negative dispersion slope and a nominally zero dispersion. The dispersion slope of the DSCF is calculated as the sum of the residual dispersions on the extreme channels of the transmission path divided by the wavelength difference between the extreme channels.

Although the technique disclosed in the '673 patent improves dispersion compensation in broadband applications, a need to further improve dispersion compensation in various applications, such as broadband applications, still exists.

SUMMARY OF THE INVENTION

The present invention provides a dispersion compensation module (DCM) for compensating dispersion of an optical fiber transmission link is provided. The optical fiber transmission link comprises a transmission fiber and the DCM. The DCM comprises at least first and second dispersion compensating fibers, DCF1 and DCF2, respectively. DCF1 and DCF2 each have a dispersion, D1 and D2, respectively, a dispersion slope, S1 and S2, respectively, and a relative dispersion slope, RDS1 and RDS2, respectively. The transmission fiber also has a dispersion, $D_{TransFiber}$, a dispersion slope, $S_{TransFiber}$, and a relative dispersion slope, $RDS_{TransFiber}$. DCF1 and DCF2 are selected based on their respective relative dispersion slopes, RDS1 and RDS2, respectively. DCF1 and DCF2 have particular lengths, L1 and L2, respectively. The DCFs are combined with each other and with the transmission fiber and the combination results in overall dispersion compensation of the optical fiber transmission link.

The present invention also comprises a transmission system comprising at least first and second dispersion compensation fibers, DCF1 and DCF2, respectively, which are combined in the DCM, and with a transmission fiber. DCF1 and DCF2 are selected based on their respective relative dispersion slopes, RDS1 and RDS2, respectively, such that when DCF1 and DCF2 are combined, the DCM is provided with an effective relative dispersion slope, RDS_DCM. has an effective RDS that matches the magnitude of the RDS of the transmission fiber, but is of opposite side. When the lengths of each of the DCFs are combined with each other and with the transmission fiber, RDS1 and RDS2 are such that the combination of the transmission fiber with the combined DCFs results in overall dispersion compensation of the optical fiber transmission link of the transmission system.

The present invention also provides a method for performing dispersion compensation. The method comprises the steps of selecting at least first and second dispersion compensating fibers, DCF1 and DCF2, respectively, each having a dispersion, D1 and D2, respectively, a dispersion slope, S1 and S2, respectively, and a relative dispersion slope, RDS1 and RDS2, respectively. Once DCF1 and DCF2 and their lengths have been selected, the DCFs are combined with each other and with a transmission fiber. The transmission fiber also has a dispersion, $D_{TransFiber}$, a dispersion slope, $S_{TransFiber}$, and a relative dispersion slope, $RDS_{TransFiber}$. DCF1 and DCF2 are selected based on their respective relative dispersion slopes, RDS1 and RDS2, such that the combination of the transmission fiber with the combined DCFs results in overall dispersion compensation of the optical fiber transmission link.

These and other features and advantages of the present invention will become apparent from the following description, drawings and claims.

DETAILED DESCRIPTION OF THE PREFERRED EMBODIMENTS

Figure 1:
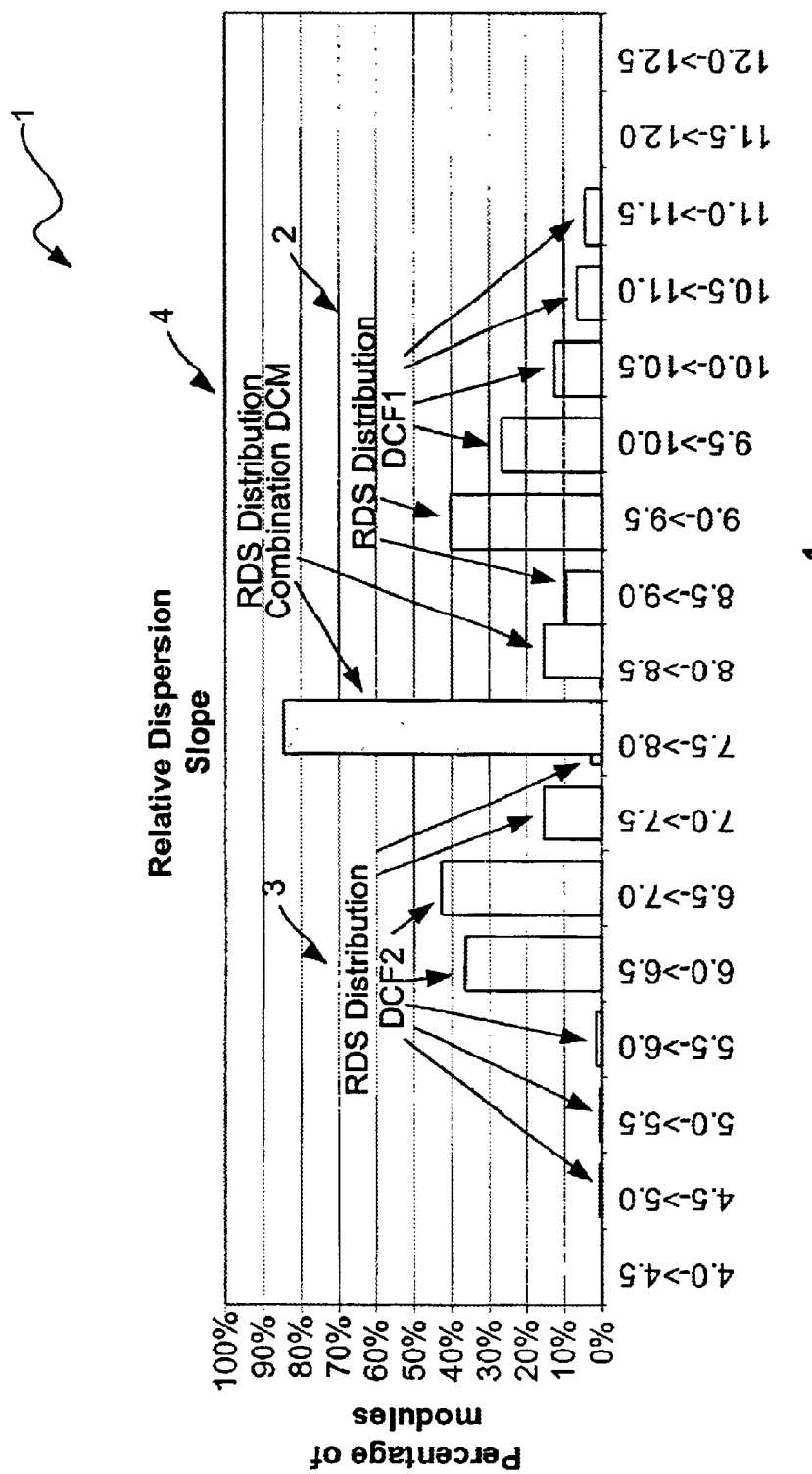
FIG. 1 is a graph illustrating RDS distributions for a first DCF, a second DCF and the combination of the two versus the percentages of DCMs that are used to match the RDS of a transmission fiber at 1580 nanometers (nm).

In accordance with the present invention, it has been determined that overall dispersion compensation over a transmission band can be further improved by simultaneously matching the RDSs of the DCM and transmission fiber and compensating the dispersion slope and dispersion of the transmission link. The present invention not only improves over dispersion compensation of the transmission link by ensuring simultaneous compensation of the center wavelength of a broad transmission band and of all of the other wavelengths of transmission band.

In accordance with the preferred embodiment of the present invention, multiple DCFs having particular RDSs are combined in a single DCM to obtain an effective RDS for the DCM that matches the RDS of the transmission fiber. In general, this is accomplished by matching the effective RDS of the DCM with the RDS of the transmission fiber. The effective RDS of the DCM is the RDS produced by combining multiple DCFs having particular RDSs. Selecting the lengths of the DCFs enables the dispersion slope and the dispersion of the transmission link to be compensated. The manner in which this can be accomplished will first be mathematically described and then graphically demonstrated.

The dispersion and the dispersion slope of a DCM can be obtained from Equations 5 and 6 below, respectively, as follows:

$$D\_DCM = D1 \times L1 + D2 \times L2 \qquad \text{(Equation 5)}$$

$$S\_DCM = S1 \times L1 + S2 \times L2 \qquad \text{(Equation 6)}$$

In Equations 5 and 6, D_DCM corresponds to the dispersion of the DCM, D1 corresponds to the dispersion of a first DCF, L1 corresponds to the length of the first DCF, D2 corresponds to the dispersion of the second DCF, L2 corresponds to the length of the second DCF, S_DCM corresponds to the dispersion slope of the DCM, S1 corresponds to the dispersion slope of the first DCF and S2 corresponds to the dispersion slope of the second DCF. The total dispersion of the DCM is a sum of the dispersion and dispersion slope of the first DCF (hereinafter "DCF1") and the dispersion and dispersion slope of the second DCF (hereinafter "DCF2"). The dispersion is in units of dispersion per unit length multiplied by the DCF length. The dispersion slope of the DCM is the sum of the dispersion slope of DCF1 multiplied by its length and the dispersion slope of the DCF2 multiplied by its length.

Equations 5 and 6 can be re-written as Equations 7 and 8, respectively, as follows:

$$L1 = D\_DCM/D1 \times (RDS2 - RDS\_DCM)/(RDS2 - RDS1) \quad \text{(Equation 7)}$$

$$L2 = (D\_DCM - L1 \times D1)/D2 \quad \text{(Equation 8)}$$

where RDS1 corresponds to the RDS for DCF1, which is=S1/D1 (both known values), RDS2 corresponds to the RDS for DCF2 which is=S2/D2 (both known values), D_DCM=the dispersion of the DCM and RDS_DCM is=S of the DCM divided by D of the DCM.

The target value D_DCM is known because the DCM dispersion for the desired system should be equal in magnitude, or almost equal, (but of opposite sign) to the magnitude of the dispersion of the transmission fiber, which is known. The other target value for the DCM, RDS_DCM, is also known because the DCM RDS value should be equal in magnitude, or almost equal, to the magnitude of the RDS of the transmission fiber. The RDS of the transmission fiber is also known.

By selecting the RDS1 to be lower than the target value RDS_DCM, and by selecting the RDS2 to be higher than the target value RDS_DCM (or vice-versa), the lengths L1 and L2 of DCF1 and DCF2 that need to be combined to meet the RDS_DCM and D_DCM target values can be determined from the above-stated Equations 7 and 8.

Thus, in accordance with the present invention, the effective target RDS for the DCM can be obtained such that it matches the RDS of the transmission fiber by selecting the RDS values of the DCFs that are to be combined in the DCM in such a way that the target effective RDS for the DCM is obtained. This ensures that higher order dispersion is compensated and that no (or very little) dispersion will occur on the center wavelength channel or on any of the other wavelength channels of the broadband. Of course, the present invention is equally applicable to non-broadband applications. The determination and selection of the lengths of DCF1 and DCF2 ensure that the dispersion and dispersion slope of the transmission link will be will be compensated, which takes care of all lower order dispersion.

It is typical for system designers to desire that the residual dispersion be close to, but not precisely, zero. Hence, the term $D_{OFFSET}$ may be introduced to offset the target value of D_DCM as follows:

$$D\_DCM = -D_{LINK} + D_{OFFSET} \quad \text{(Equation 9)}$$

Equations 5–8 would be equally applicable in the case where the dispersion of the DCM is to have a preselected offset.

In another embodiment of the present invention, the dispersion of the DCM and of the transmission fiber are not matched by presuming that the DCM RDS matches the RDS of the transmission fiber. Rather, a term ($D_{Target}$–D_DCM) is determined at, for example, the minimum wavelength, the center wavelength and the maximum wavelength to obtain a value for the term ($D_{Target}$–D_DCM) at all three wavelengths. Using these values, the values of L1 and L2 are calculated that minimize the term ($D_{Target}$–D_DCM) at all three wavelengths. In essence, this corresponds to determining the DCF lengths L1 and L2 such that the best match of the DCM dispersion to the target dispersion at the three wavelengths is obtained, which, consequently, corresponds to the best fit for the entire transmission band. As in the first embodiment, in accordance with this embodiment, two (or more) DCFs (or more) are being used to obtain a more accurate match of the DCM dispersion to the transmission link dispersion. The only difference between these embodiments is the manner in which the lengths L1 of DCF1 and L2 of DCF2 are determined.

FIGS. 1–6 are various graphs that demonstrate the manner in which the present invention provides very precise compensation. FIG. 1 is a graph 1 illustrating RDS distributions versus the percentages of DCMs that are used to match the RDS of a TW-RS transmission fiber at 1580 nanometers (nm). The graph 1 shows the RDS distributions for DCF1, labeled with the numeral 2, for DCF2, labeled with the numeral 3, and for the combination 4 of DCF1 and DCF2. The average RDS of DCF1 was 0.00965 nm$^{-1}$. The average RDS of DCF2 was 0.00666 nm$^{-1}$. The average RDS for the combination 4 of DCF1 and DCF2 was 0.00795 nm$^{-1}$, which matches the target RDS of the TW-RS transmission fiber at 1580 nm. For this experiment, DCF1 had a RDS higher than the target RDS value and DCF2 had a RDS lower than the target value. Thus, it can be seen from the graph 1 that by combining the two DCFs into one DCM, the target RDS was very accurately obtained by a large percentage of the combination DCMs.

Figure 2:
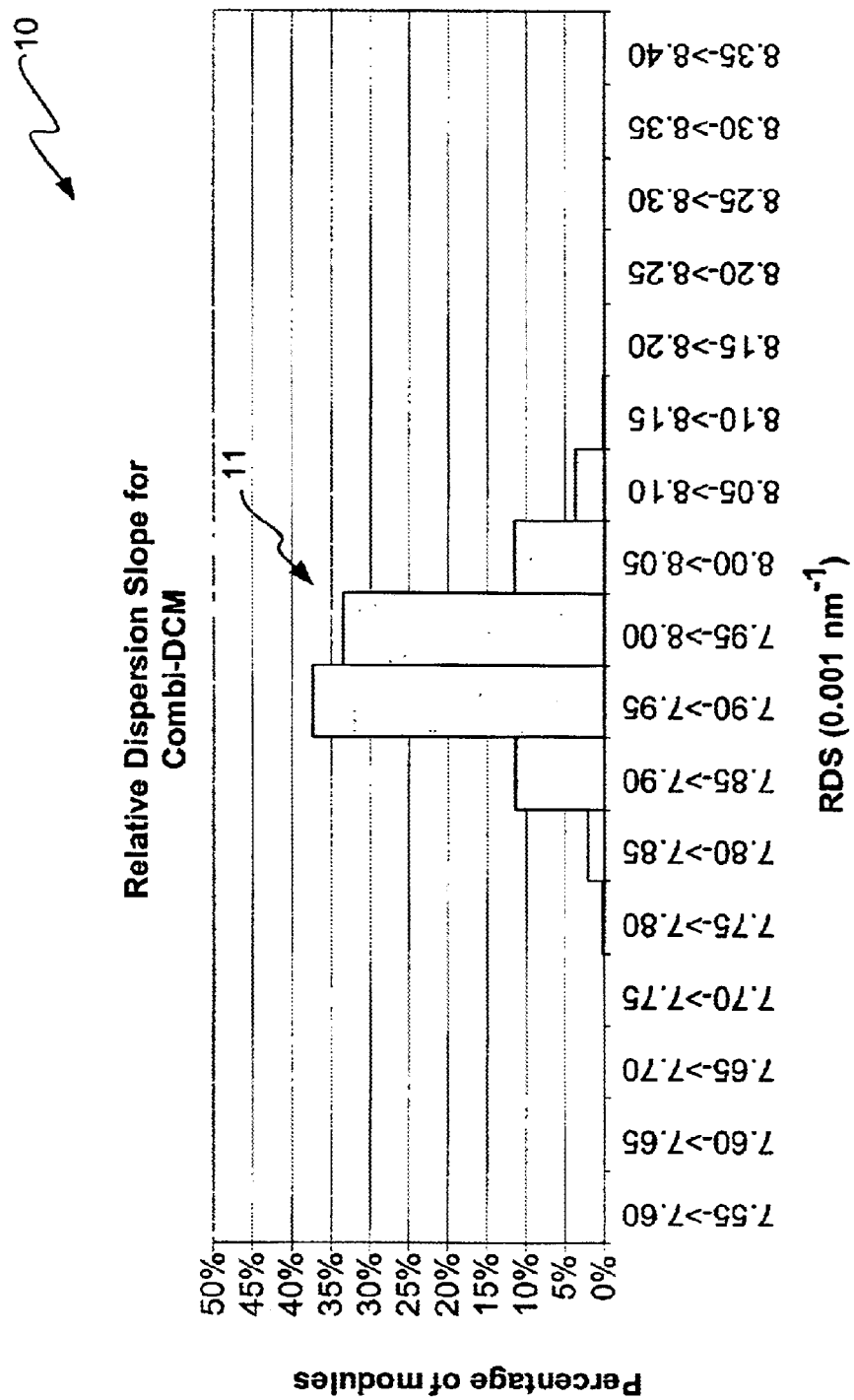
FIG. 2 is a graph illustrating the distribution of the RDSs of the resulting combination of the DCFs shown in FIG. 1.

FIG. 2 is a graph 10 illustrating the distribution 11 of the RDSs of the resulting combination DCM (i.e., comprising DCF1 and DCF2) versus the percentage of DCMs in which the combination of DCF1 and DCF2 was used. By looking at FIGS. 1 and 2, it can be seen that a smaller percentage of modules are shown on the vertical axis in FIG. 2 and that the RDS scale shown on the horizontal axis of FIG. 2 is of much higher resolution than the RDS scale of FIG. 1. A comparison of the individual distributions for DCF1 and DCF2 shown in FIG. 1 with the combination distribution of DCF1 and DCF2 shown in FIG. 2 shows that the accuracy of the RDS for the combination is improved roughly by a factor of 10 when compared individually to either the RDS of DCF1 or to the RDS of DCF2.

Also, if a DCF with a negative dispersion slope is combined in the DCM with a fiber that has a positive dispersion, then it is possible for the RDS of the DCM to be increased above the RDS range of the DCF itself. This can happen if 1) the second fiber has a negative dispersion slope, or 2) a positive dispersion slope, but a lower RDS than that of the DCF. In both cases, the higher RDS for the DCM is obtained by 1) using a greater length of DCF than otherwise would be required, thereby increasing the absolute dispersion slope of the DCM and 2) by lowering the dispersion of the DCM to the desired value by using the fiber with the positive dispersion. The correct lengths for both the DCF and the positive dispersion fiber can be calculated from the dispersion and RDSs of the two fibers of the DCM. For example, if the DCF has a RDS of 0.01 nm$^{-1}$ at 1550 nm, the effective RDS of the DCM can be increased by combining the DCF with a standard single mode fiber, which typically has a dispersion of 17 ps/nm/km and a RDS= 0.0035 nm$^{-1}$ (positive dispersion slope) at 1550 nm. This enables compensation of the dispersion slope of transmission fibers that simply cannot be effectively compensated by a DCM having a single RDS. This is graphically demonstrated by FIGS. 3 and 4.

Figure 3:
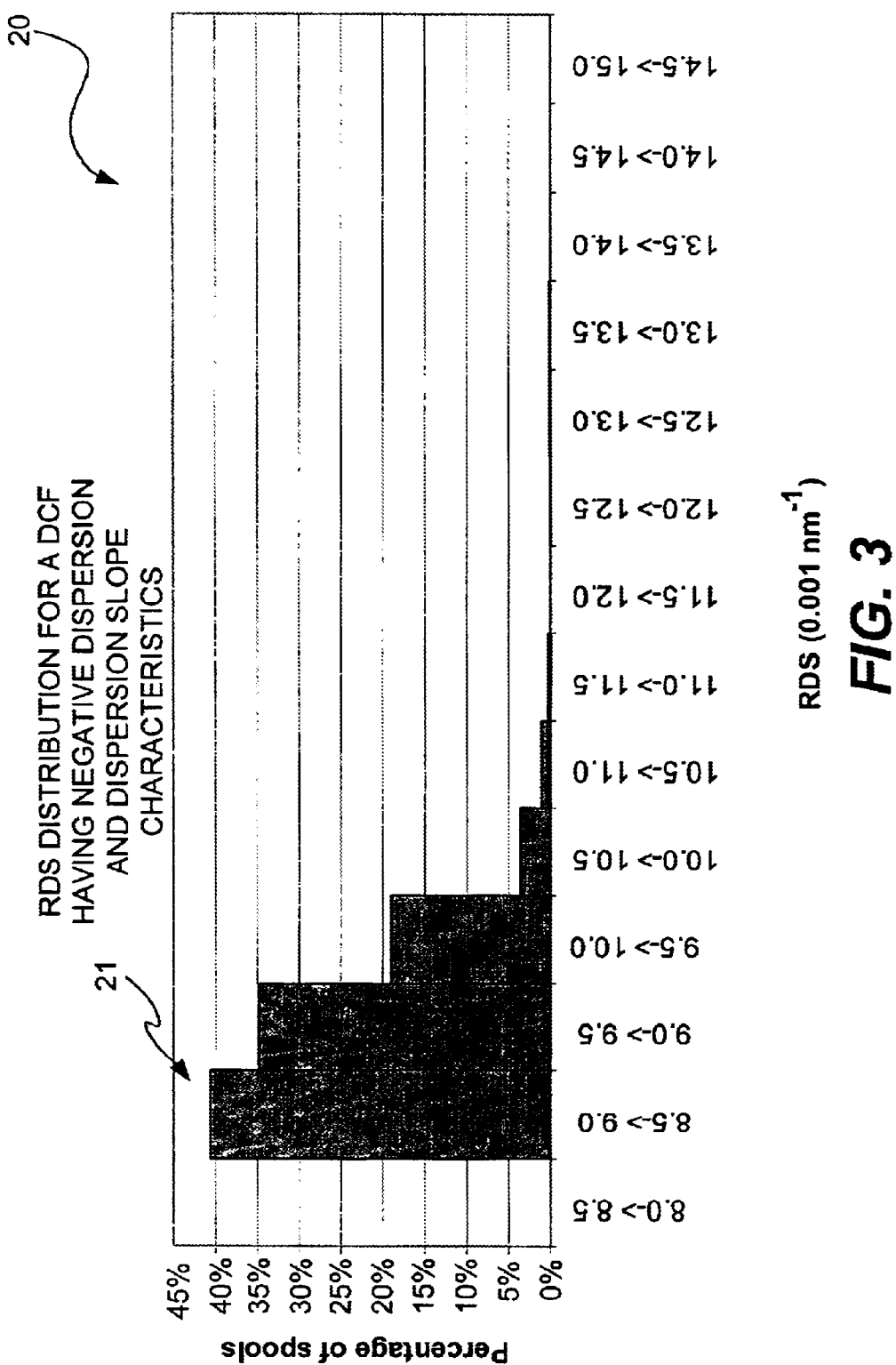
FIG. 3 is a graph illustrating the RDS distribution for a DCF having a negative dispersion slope.
Figure 4:
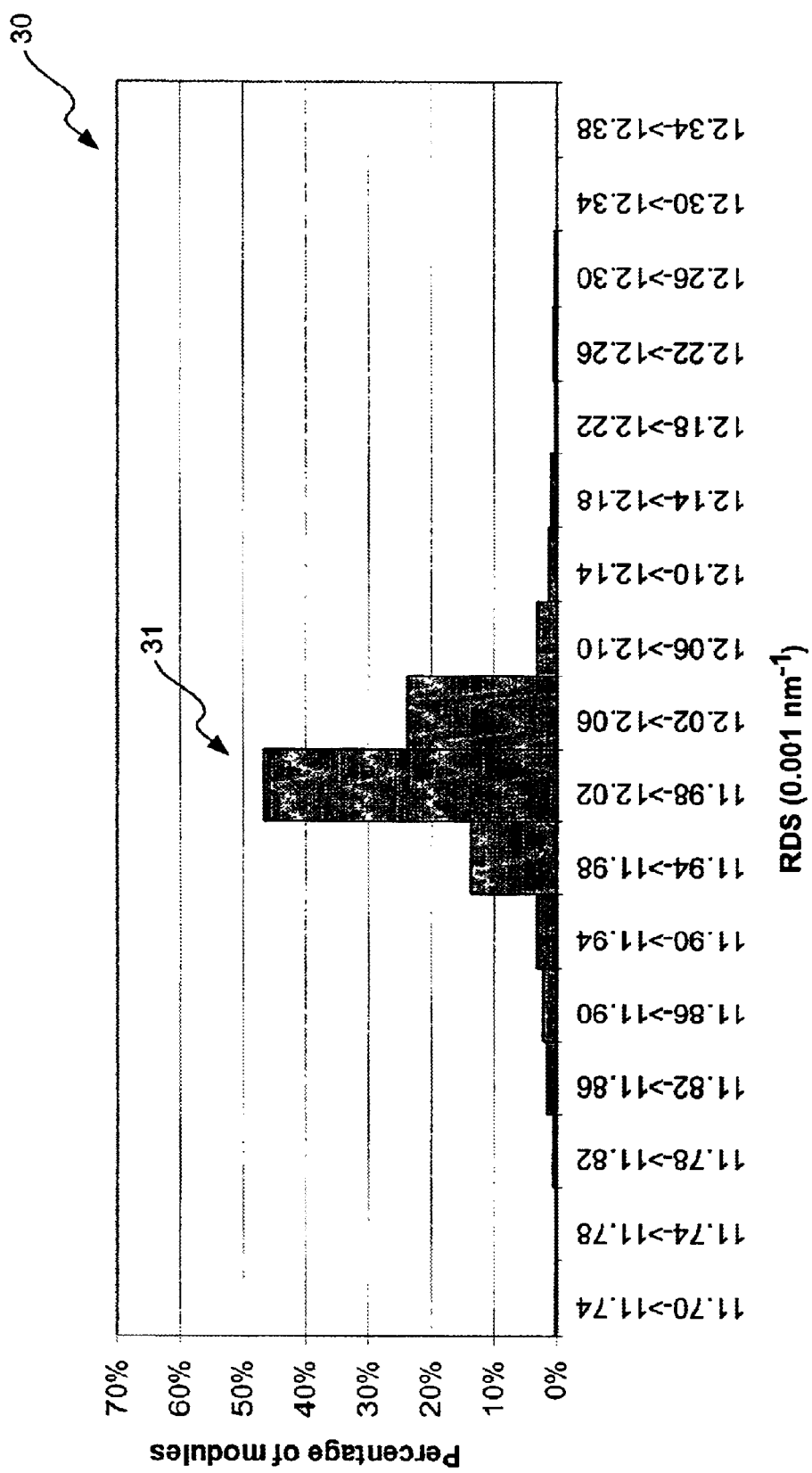
FIG. 4 is a graph 30 illustrating the RDS distribution for the DCF of FIG. 3 combined with a fiber having a positive dispersion.

The graph 20 of FIG. 3 illustrates the RDS distribution 21 for a DCF having a negative dispersion slope. FIG. 4 is a graph 30 that illustrates the RDS distribution 31 for the DCF of FIG. 3 combined with a fiber having a positive dispersion. The average RDS of the combination DCM of FIG. 4 is approximately 20% higher than the average RDS of the DCF of FIG. 3. Also, the width of the combined DCM RDS distribution is only about ±2.5%, whereas the width of the RDS distribution of the DCF of FIG. 3 is approximately ±15%. Thus, the dispersion match of the DCM to the transmission link is much more accurate for the combination DCM.

Figure 5:
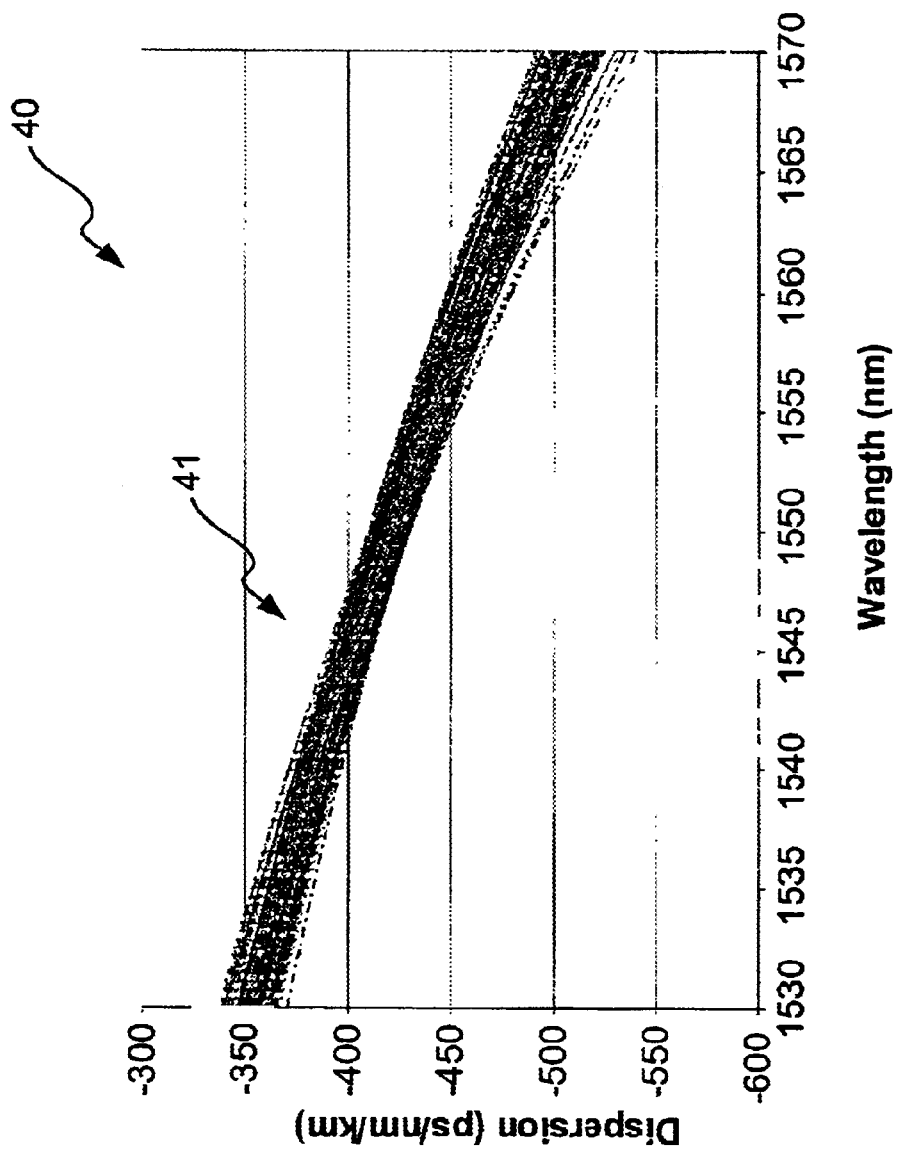
FIG. 5 is a graph illustrating the dispersion for DCMs that utilize the single fiber solution of FIG. 3.
Figure 6:
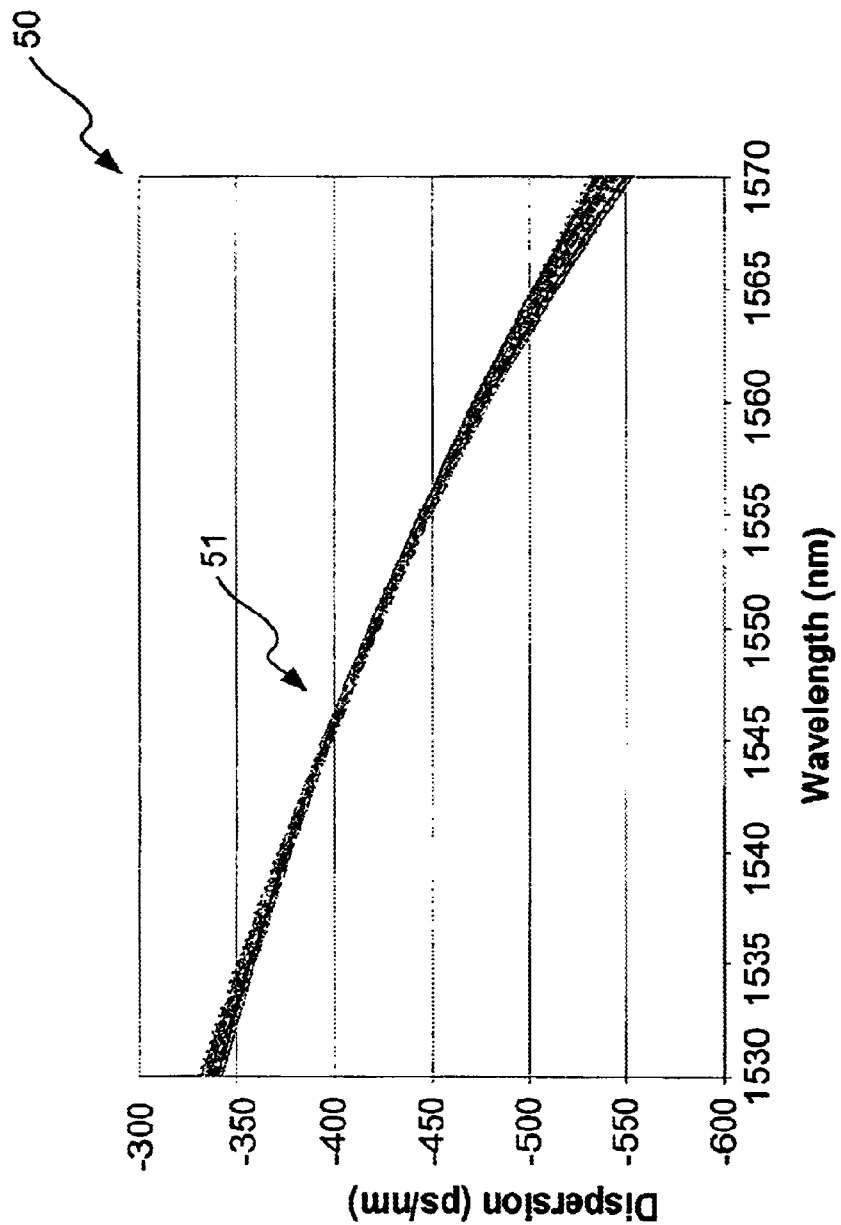
FIG. 6 is a graph that shows the dispersion of the corresponding combination DCM of FIG. 4.

FIG. 5 is a graph 40 that illustrates the dispersion for DCMs that utilize the single fiber solution of FIG. 3. The dispersion variation at the target wavelength of 1550 nm (target dispersion of −420 p/nm) is indicated by the spreading out of the dispersion curves 41. FIG. 6 is a graph 51 that shows the dispersion of the corresponding combination DCM of FIG. 4, which indicates that the spreading out of the dispersion curves 51 is much less than the spreading out of the dispersion curves 51 shown in FIG. 5. A comparison of the dispersion curves of FIGS. 5 and 6 indicates that the dispersion for the combination DCMs (i.e., the DCMs where at least two fibers are combined) are highly accurate over the entire transmission bandwidth.

Figure 7:
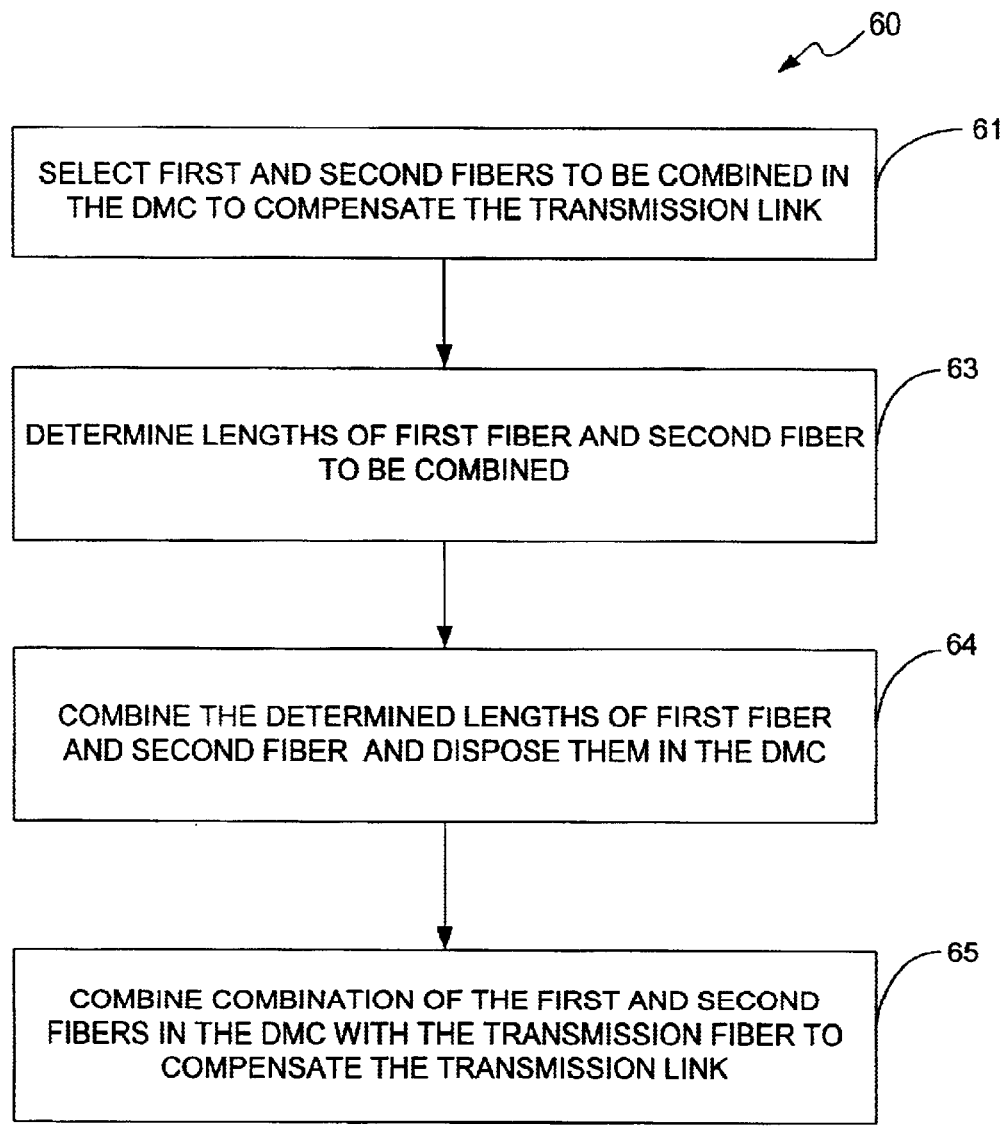
FIG. 7 is a flow chart illustrating the method of the present invention.

FIG. 7 is a flow chart illustrating the method of the present invention, which applies to both of the above-described embodiments. In general, the method 60 comprises the step of selecting a first fiber and a second fiber to be combined with each other to provide the DCM with the desired or necessary compensation properties, as indicated by block 61. Once the fibers that are to be combined have been selected, the lengths of the first and second fibers that are to be combined are determined, as indicated by block 63. Then, the lengths of the first and second fibers are combined, as indicated by block 64. The DCM comprising the combined lengths of the first and second fibers are then combined with the transmission fiber, as indicated by block 65. The manner in which the first and second fibers are selected and the manner in which their respective lengths are determined are not limited to any particular techniques or methodology. The preferred ways for accomplishing these tasks have been discussed above for purposes of demonstrating the concepts and principals of the present invention. Those skilled in the art will understand, in view of the discussion provided herein, that these determinations can be made in different manners. Also, the manner in which the combination steps 64 and 65 are, or can be, performed is known to those skilled in the art. Therefore, a discussion of the manner in which these tasks are performed will be not be provided herein.

The Polarization Mode Dispersion (PMD) of the DCM is also improved by combining two or more DCFs, provided the DCFs have equal PMD distributions. This will inherently introduce an averaging effect because it is unlikely that both DCFs will have PMD values from the high end of the PMD distribution scale. Therefore, the PMD of the DCM is effectively reduced. As will be understood by those skilled in the art, any reduction in PMD is important because the PMD value is an indicator of the varying time delays for different polarizations of light propagating through the fiber. If the PMD is relatively high, the pulse spreading due to these varying delays will be relatively large. Conversely, if the PMD value is relatively low, the pulse spreading due to these delays will be relatively low. Thus, by improving the PMD, dispersion is further compensated.

As stated above, more than two DCFs can be combined to obtain even better compensation of the higher order dispersion (i.e., compensation of residual dispersion on the wavelengths other than the center wavelength). For example, two DCFs can be combined to obtain a DCM RDS that matches the RDS of the transmission fiber, and a third DCF can be combined with the other two DCFs to reduce the curvature of the dispersion curve, which means that the dispersion of the link, if any, is kept constant and thus is predictable.

Another benefit of the present invention is that when two or more DCFs having particular RDSs are combined to obtain a DCM RDS that matches the RDS of the transmission fiber, the dispersion of the DCM can be controlled much better to either increase the useable bandwidth for a given maximum residual dispersion or decrease the residual dispersion for a fixed bandwidth. Both of these capabilities can greatly improve the performance of optical communication systems.

In all of the above discussion, it should be understood that short lengths (under 50 m) of additional types of fibers may be used as transition fibers in the DCM between the DCFs and/or between the DCFs and a transmission fiber to reduce the splice loss of the DCFs to each other and/or to a transmission fiber. It should be noted that these fibers are not to be considered as additional DCFs.

In summary, the present invention demonstrates that by combining multiple fibers of particular lengths in a single DCM that have particular, a combined DCM for the DCM can be obtained that enables total and overall compensation to be achieved over the entire bandwidth of the transmission link. By selecting fibers that, when combined, provide an effective RDS value that matches the RDS value of the transmission fiber, higher order residual dispersion is reduced or eliminated. Once the RDS values for the fibers to be combined are known, the lengths of the fibers of the DCM can be selected such that all lower order dispersion is compensated. Thus, the present invention enables simultaneous compensation of the dispersion and dispersion slope of the transmission link to be compensated, which is highly desirable, especially in broadband applications where higher order residual dispersion can result in deleterious effects at the edges of the transmission band. Also, by combining two or more DCFs, the variation in the dispersion of the combination DCM can be significantly reduced. In addition, the present invention lessens the need to make new DCFs to compensate for a specific type of transmission fiber because compensation can be obtained by combining a DCF having a lower RDS with a DCF having a higher RDS. Furthermore, if a DCF having a preselected RDS is combined with a positive dispersion fiber, the effective RDS of the DCM can be increased beyond that of the DCF itself, which allows compensation of the dispersion slope of transmission fibers that otherwise would are incapable of being effectively compensated with a single DCF.

It should be noted that the above-described embodiments of the present invention are examples of implementations. Those skilled in the art will understand from the disclosure provided herein that many variations and modifications may be made to the embodiments described without departing from the scope of the present invention. All such modifications and variations are within the scope of the present invention.

What is claimed is:

1. A dispersion compensation module (DCM) for compensating dispersion of an optical fiber transmission link, the optical fiber transmission link comprising a transmission fiber, the DCM comprising:

at least first and second dispersion compensating fibers, DCF1 and DCF2, respectively, DCF1 and DCF2 each having a dispersion, D1 and D2, respectively, a dispersion slope, S1 and S2, respectively, and a relative dispersion slope, RDS1 and RDS2, respectively, the transmission fiber having a dispersion, $D_{TransFiber}$, a dispersion slope, $S_{TransFiber}$, and a relative dispersion slope, $RDS_{TransFiber}$, and wherein DCF1 and DCF2 are selected based on their relative dispersion slopes, RDS1 and RDS2, respectively, DCF1 and DCF2 having particular, lengths, L1 and L2, respectively, the DCFs being combined with each other and with the transmission fiber, wherein RDS1 and RDS2 are such that the combination of the transmission fiber with the combined DCFs results in overall dispersion compensation of the optical fiber transmission link.

2. The DCM of claim 1, wherein the RDS1 and RDS2 are selected based on the RDS value of the transmission fiber.

3. The DCM of claim 2, wherein the DCM has a dispersion, D_DCM, a dispersion slope, S_DCM, and a relative dispersion slope, RDS_DCM that are result from the combined lengths of the DCF1 and DCF2, and wherein the lengths L1 and L2 are determined by equations:

$$L1 = D\_DCM/D1 \times (RDS2 - RDS\_DCM)/(RDS2 - RDS1)$$

$$L2 = (D\_DCM - L1 \times D1)/D2,$$

wherein D_DCM is approximately equal in magnitude but opposite in sign to $D_{TransFiber}$ and wherein $D_{TransFiber}$ has a known magnitude and sign, and wherein RDS_DCM is approximately equal in magnitude but opposite in sign to $RDS_{TransFiber}$, and wherein $RDS_{TransFiber}$ has a known magnitude and sign.

4. The DCM of claim 3, wherein the DCM is implemented in a broadband application in which the combined DCFs and transmission line are comprised as a transmission link that utilizes a plurality of wavelengths for transmitting data over the transmission link, and wherein the all of the wavelengths are dispersion compensated by selecting the DCFs such that the RDS_DCM will at least substantially match $RDS_{TransFiber}$ and by selecting proper lengths for L1 and L2.

5. The DCM of claim 4, wherein the DCFs are selected and combined such that residual dispersion is almost, but not totally, eliminated over at least some of said wavelengths.

6. The DCM of claim 3, wherein the first and second DCFs are selected such that, when combined, RDS_DCM will at least substantially match the $RDS_{TransFiber}$.

7. The DCM of claim 1, wherein RDS1 is higher than $RDS_{TransFiber}$, and wherein RDS2 is lower than $RDS_{TransFiber}$.

8. The DCM of claim 1, wherein the combined DCFs and transmission line are comprise a transmission link that utilizes a plurality of wavelengths for transmitting data over the transmission link and wherein D_DCM is selected so that it does not match $D_{TransFiber}$ and is calculated for at least two of said plurality of wavelengths to obtain a D_DCM value for each respective wavelength, the lowest D_DCM value calculated being used to obtain an L1 and an L2 value for said at least two of said plurality of wavelengths, the respective L1 values for each wavelength being used to obtain a new L1 value, the respective L2 values for each wavelength being used to obtain a new L2 value, the new L1 and L2 lengths of said at least first and second DCFs, respectively, being combined with each other and with said transmission fiber to provide dispersion compensation over said plurality of wavelengths.

9. The DCM of claim 1, wherein at least a third DCF, DCF3, is combined with DCF1 and DCF2, respectively, DCF3 having a dispersion D3, a dispersion slope S3, and a relative dispersion slope, RDS3 and wherein DCF1, DCF2 and DCF3 are selected based on their respective relative dispersion slopes, RDS1, RDS2, and RDS3, respectively, DCF3 having a particular length, L3, the DCFs being combined with each other and with the transmission fiber, wherein RDS1, RDS2 and RDS3 are such that the combination of the transmission fiber with the combined DCFs results in overall dispersion compensation of the optical fiber transmission link.

10. A transmission system comprising:
at least one dispersion compensation module (DCM);
at least first and second dispersion compensation fibers, DCF1 and DCF2, respectively, DCF1 and DCF2 being combined in the DCM;
a transmission fiber, the transmission fiber having a dispersion, $D_{TransFiber}$, a dispersion slope, $S_{TransFiber}$, and a relative dispersion slope, $RDS_{TransFiber}$, and wherein DCF1 and DCF2 are selected based on their respective relative dispersion slopes, RDS1 and RDS2, respectively, the DCF1 and DCF2 having particular, lengths, L1 and L2, respectively, the DCFs being combined with each other and with the transmission fiber, wherein RDS1 and RDS2 are such that the combination of the transmission fiber with the combined DCFs results in overall dispersion compensation of the optical fiber transmission link.

11. The transmission system of claim 10, wherein the RDS1 and RDS2 are selected based on the RDS value of the transmission fiber.

12. The transmission system of claim 11, wherein the DCM has a dispersion, D_DCM, a dispersion slope, S_DCM, and a relative dispersion slope, RDS_DCM that are result from the combined lengths of the DCF1 and DCF2, and wherein the lengths L1 and L2 are determined by equations:

$$L1 = D\_DCM/D1 \times (RDS2 - RDS\_DCM)/(RDS2 - RDS1)$$

$$L2 = (D\_DCM - L1 \times D1)/D2,$$

wherein D_DCM is approximately equal in magnitude but opposite in sign to $D_{TransFiber}$ and wherein $D_{TransFiber}$ has a known magnitude and sign, and wherein RDS_DCM is approximately equal in magnitude but opposite in sign to $RDS_{TransFiber}$, and wherein $RDS_{TransFiber}$ has a known magnitude and sign.

13. The transmission system of claim 12, wherein the DCM is implemented in a broadband application in which the combined DCFs and transmission line are comprised as a transmission link that utilizes a plurality of wavelengths for transmitting data over the transmission link, and wherein the all of the wavelengths are dispersion compensated by selecting the DCFs such that the RDS_DCM will at least substantially match $RDS_{TransFiber}$ and by selecting proper lengths for L1 and L2.

14. The transmission system of claim 13, wherein the DCFs are selected and combined such that residual dispersion is almost, but not totally, eliminated over at least some of said wavelengths.

15. The transmission system of claim 12, wherein the first and second DCFs are selected such that, when combined, RDS_DCM will at least substantially match the $RDS_{TransFiber}$.

16. The transmission system of claim 10, wherein RDS1 is higher than $RDS_{TransFiber}$, and wherein RDS2 is lower than $RDS_{TransFiber}$.

17. The transmission system of claim 10, wherein the combined DCFs and transmission line are comprise a transmission link that utilizes a plurality of wavelengths for transmitting data over the transmission link and wherein DCF1 and DCF2 are selected to ensure that D_DCM does not match $D_{TransFiber}$ and is calculated for at least two of said plurality of wavelengths to obtain a D_DCM value for each respective wavelength, the lowest D_DCM value calculated being used to obtain an L1 and an L2 value for said at least two of said plurality of wavelengths, the respective L1 values for each wavelength being used to obtain a new L1 value, the respective L2 values for each wavelength being used to obtain a new L2 value, the new L1 and L2 lengths of said at least first and second DCFs, respectively, being combined with each other and with said transmission fiber to provide dispersion compensation over said plurality of wavelengths.

18. The transmission system of claim 10, further comprising at least a third DCF, DCF3, is combined with DCF1 and DCF2, respectively, DCF3 having a dispersion D3, a dispersion slope S3, and a relative dispersion slope, RDS3 and wherein DCF1,DCF2 and DCF3 are selected based on their respective relative dispersion slopes, RDS1, RDS2, and RDS3, respectively, DCF3 having a particular length, L3, the DCFs being combined with each other and with the transmission fiber, wherein RDS1, RDS2 and RDS3 are such that the combination of the transmission fiber with the combined DCFs results in overall dispersion compensation of the optical fiber transmission link.

at least first and second dispersion compensation fibers, DCF1 and DCF2, respectively, DCF1 and DCF2 being combined in the DCM;

a transmission fiber, the transmission fiber having a dispersion, $D_{TransFiber}$, a dispersion slope, $S_{TransFiber}$, and a relative dispersion slope, $RDS_{TransFiber}$, and wherein DCF1 and DCF2 are selected based on their respective relative dispersion slopes, RDS1 and RDS2, respectively, the DCF1 and DCF2 having particular, lengths, L1 and L2, respectively, the DCFs being combined with each other and with the transmission fiber, wherein RDS1 and RDS2 are such that the combination of the transmission fiber with the combined DCFs results in overall dispersion compensation of the optical fiber transmission link.

19. A method for performing dispersion compensation, the method comprising the steps of:

selecting at least first and second dispersion compensating fibers, DCF1 and DCF2, respectively, DCF1 and DCF2 each having a dispersion, D1 and D2, respectively, a dispersion slope, S1 and S2, respectively, and a relative dispersion slope, RDS1 and RDS2, respectively;

combining a length, L1 of DCF1 with a length L2 of DCF2; and combining the combined DCFs with a transmission fiber, the transmission fiber having a dispersion, $D_{TransFiber}$, a dispersion slope, $S_{TransFiber}$, and a relative dispersion slope, $RDS_{TransFiber}$, and wherein DCF1 and DCF2 are selected based on their respective relative dispersion slopes, RDS1 and RDS2, wherein RDS1 and RDS2 are such that the combination of the transmission fiber with the combined DCFs results in overall dispersion compensation of the optical fiber transmission link.

20. The method of claim 19, wherein RDS1 and RDS2 are selected based on the RDS value of the transmission fiber.

21. The method of claim 20, wherein RDS1 is higher than $RDS_{TransFiber}$, and wherein RDS2 is lower than $RDS_{TransFiber}$.

22. The method of claim 21, wherein the DCM has a dispersion, D_DCM, a dispersion slope, S_DCM, and a relative dispersion slope, RDS_DCM, that are result from the combining lengths of the DCF1 and DCF2, and wherein the lengths L1 and L2 are determined by equations:

$$L1 = D\_DCM/D1 \times (RDS2 - RDS\_DCM)/(RDS2 - RDS1)$$

$$L2 = (D\_DCM - L1 \times D1)/D2,$$

wherein D_DCM is approximately equal in magnitude but opposite in sign to $D_{TransFiber}$ and wherein $D_{TransFiber}$ has a known magnitude and sign, and wherein RDS_DCM is approximately equal in magnitude but opposite in sign to $RDS_{TransFiber}$, and wherein $RDS_{TransFiber}$ has a known magnitude and sign.

23. The method of claim 22, wherein the first and second DCFs are selected such that, when combined, RDS_DCM will at least substantially match the $RDS_{TransFiber}$.

24. The method of claim 23, wherein the DCM is implemented in a broadband application in which the combined DCFs and transmission line are comprised as a transmission link that utilizes a plurality of wavelengths for transmitting data over the transmission link, and wherein the all of the wavelengths are dispersion compensated by selecting the DCFs such that the RDS_DCM will at least substantially match $RDS_{TransFiber}$ and by selecting proper lengths for L1 and L2.

25. The method of claim 24, wherein the steps of selecting and combining the DCFs are such that residual dispersion is almost, but not totally, eliminated over at least some of said wavelengths.

26. The method of claim 19, wherein, during the selection step, the DCF1 and DCF2 are selected to ensure that when DCF1 and DCF2 are combined, D_DCM does not match $D_{TransFiber}$, and wherein D_DCM is determined for at least two of said plurality of wavelengths to obtain a D_DCM value for each respective wavelength, the method further comprising:

using the lowest D_DCM value to obtain L1 and an L2 lengths for said at least two of said plurality of wavelengths, the respective L1 lengths for each wavelength being used to obtain a new L1 length, the respective L2 lengths for each wavelength being used to obtain a new L2 value; and combining the new L1 and L2 lengths of DCF1 and DCF2, respectively, with each other and with said transmission fiber to provide dispersion compensation over said plurality of wavelengths.

27. The method of claim 19, further comprising the steps of:

selecting at least a third DCF, DCF3, to be combined with DCF1 and DCF2, respectively, DCF3 having a dispersion D3, a dispersion slope S3, and a relative dispersion slope, RDS3;

combining DCF3 with DCF1 and DCF2 combined with each other and with the transmission fiber, wherein RDS1, RDS2 and RDS3 are such that the combination of the transmission fiber with the combined DCFs results in overall dispersion compensation of the optical fiber transmission link.

* * * * *